(12) United States Patent
Elzur et al.

(10) Patent No.: US 9,031,081 B2
(45) Date of Patent: May 12, 2015

(54) METHOD AND SYSTEM FOR SWITCHING IN A VIRTUALIZED PLATFORM

(75) Inventors: Uri Elzur, Irvine, CA (US); Patricia Ann Thaler, Carmichael, CA (US); Hemal Shah, Trabuco Canyon, CA (US)

(73) Assignee: Broadcom Corporation, Irvine, CA (US)

( * ) Notice: Subject to any disclaimer, the term of this patent is extended or adjusted under 35 U.S.C. 154(b) by 684 days.

(21) Appl. No.: 12/852,839

(22) Filed: Aug. 9, 2010

(65) Prior Publication Data

US 2011/0032944 A1    Feb. 10, 2011

Related U.S. Application Data

(60) Provisional application No. 61/232,637, filed on Aug. 10, 2009, provisional application No. 61/360,222, filed on Jun. 30, 2010.

(51) Int. Cl.
*H04L 12/56* (2006.01)
*H04L 12/931* (2013.01)

(52) U.S. Cl.
CPC ............ *H04L 49/602* (2013.01); *H04L 49/65* (2013.01); *H04L 49/70* (2013.01)

(58) Field of Classification Search
USPC ............ 370/254, 389, 390, 395.53; 709/223, 709/224; 718/1, 100, 105
See application file for complete search history.

(56) References Cited

U.S. PATENT DOCUMENTS

| | | | |
|---|---|---|---|
| 8,037,180 B2 * | 10/2011 | Smith et al. ................... | 709/225 |
| 8,054,832 B1 * | 11/2011 | Shukla et al. ................. | 370/389 |
| 2007/0067432 A1 * | 3/2007 | Tarui et al. ..................... | 709/223 |
| 2010/0054260 A1 * | 3/2010 | Pandey et al. ............. | 370/395.53 |
| 2011/0035494 A1 * | 2/2011 | Pandey et al. ................. | 709/224 |
| 2012/0263187 A1 * | 10/2012 | Belanger et al. .............. | 370/401 |

* cited by examiner

*Primary Examiner* — Hassan Phillips
*Assistant Examiner* — Saba Tsegaye
(74) *Attorney, Agent, or Firm* — Brinks Gilson & Lione

(57) ABSTRACT

A local manager in a local networking domain may configure a plurality of logical switches by combining switching functions available in network devices and/or network switches in the local networking domain. The configuration may utilize vertical and/or horizontal combinations of the switching functions. The switching functions may comprise network switch-based switching functions, and/or hypervisor-level switching functions and/or network adapter-level switching functions available in network devices which may be configured as virtualized platforms. The local manager may provide interfacing services to enable exposing configured logical switches. The interfacing services may comprise an internal interface, which may be utilized, via the local manager, to control the switching functions corresponding to logical switches and/or to route messages sent to and/or from the logical switches. The interfacing services may also comprise an external interface, which may be used by external entities, such as remote management entities, to manage and/or interact with configured logical switches.

20 Claims, 9 Drawing Sheets

METHOD AND SYSTEM FOR SWITCHING IN A VIRTUALIZED PLATFORM

CROSS-REFERENCE TO RELATED APPLICATIONS/INCORPORATION BY REFERENCE

This patent application makes reference to, claims priority to and claims benefit from U.S. Provisional Application Ser. No. 61/232,637 filed on Aug. 10, 2009, and U.S. Provisional Application Ser. No. 61/360,222 filed on Jun. 30, 2010. This application also makes reference to:
U.S. Provisional Application Ser. No. 61/156,186 filed on Feb. 27, 2010;
U.S. application Ser. No. 12/714,680 filed on Mar. 1, 2010;
U.S. Provisional Application Ser. No. 61/231,726 filed on Aug. 6, 2009; and
U.S. application Ser. No. 12/850,858 filed on Aug. 5, 2010.

Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to networking. More specifically, certain embodiments of the invention relate to a method and system for switching in a virtualized platform.

BACKGROUND OF THE INVENTION

An electronic communication network is a collection of two or more computing nodes, which are communicatively coupled via a transmission medium and utilized for transmitting information. Most networks adhere to the layered approach provided by the open systems interconnect (OSI) reference model. The OSI reference provides a seven (7) layer approach, which includes an application layer, (Layer 7), a presentation layer (layer 6), a session layer (Layer 5), a transport layer (Layer 4), a network layer (Layer 3), a data link layer (Layer 2) and a physical layer (Layer 1). Layer 7 through layer 5 inclusive may comprise upper layer protocols, while layer 4 through layer 1 may comprise lower layer protocols. Some networks may utilize only a subset of the 7 OSI layers. For example, the TCP/IP model, or Internet Reference model generally utilizes a 5 layer model, which comprises an application layer, (Layer 7), a transport layer (Layer 4), a network layer (Layer 3), a data link layer (Layer 2) and a physical layer (Layer 1). These five layers can be broken down into a fairly specific set of responsibilities or services, which they provide.

As electronic communication networks become increasingly popular, ways of exchanging data of various types, sizes for a variety of applications and business and consumers alike want faster and faster network access on more and more devices. Furthermore, malicious traffic and/or other security threats also increase with the increased reliance on electronic information. Consequently, communicating the ever increasing amounts of data and number of devices in a network presents many challenges to network and system designers and administrators.

Virtualization is one area that system designers and administrators have looked to for improving networks. In this regard, in non-virtualized systems, a single machine, such as a server or a client for example, may be utilized to concurrently support multiple server operations or services. For example, a single server may be utilized for providing access to business applications while also operating as an email server, a database server, and/or an exchange server. The server may generally support the various server operations by utilizing a single operating system (OS). The server operations, via the single OS, make use of server processing resources such as the central processing unit (CPU), memory, network interface card (NIC), peripheral sound card, and/or graphics card, for example. In many instances, the server resources may not be efficiently utilized because the demand for server operations generally vary based on the type of service provided and/or user needs. Consolidating server services into a single physical machine may result in an improvement in server efficiency. However, consolidation also removes the level of protection that is provided when the operations are maintained separately. For example, when the operations are consolidated, a crash or failure in a database server may also result in the loss of email services, exchange services, and/or application services.

Virtualization, however, may improve server efficiency. Virtualization may comprise utilizing multiple operating systems running concurrently on the server so that each operating system supports a different server operation or application or service, for example. The multiple operating systems may be referred to as guest operating systems (GOSs) or child partitions. This approach maintains the level of protection provided when server operations are not consolidated under a single operating system while also enabling the optimization of the usage of the processing resources available to the server. The use of multiple guest operating systems may be referred to as OS virtualization because each GOS perceives to have full access to the server's hardware resources. In this regard, a GOS is unaware of the presence of any other GOS running on the server. In order to implement OS virtualization, a software layer may be utilized to arbitrate access to the server's hardware resources. This software layer may be referred to as a hypervisor or virtual machine (VM) monitor, for example. The hypervisor may enable the multiple GOSs to access the hardware resources in a time-sharing manner. This software layer may be assisted by a trusted GOS (TGOS), which may also be referred to as a parent partition, or Virtual Machine Kernel (VMK) for instance. Although virtualization is useful in many contexts, it does not address many of the challenges faced by system designers and network administrators, and in-fact, presents many new challenges.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for switching in a virtualized platform, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for switching in a virtualized platform. In various embodiments of the invention, a local manager in a local networking domain may configure, control, and/or manage a plurality of logical switches, which may be configured by combining switching functions in network devices and/or network switches available in the local networking domain. The network switches may comprise one or more blade switches and/or top-of-rack (ToR) switches. The switching functions may comprise network switch-based switching functions that may be provided by the network switches in the local networking domain, and/or hypervisor-based switching functions and/or network adapter-based switching functions available in the network devices in the local networking domain, when the network devices are configured as virtualized platforms for example. Hypervisor-based switching functions may comprise a Virtual Switch (vSwitch) functions, Virtual Ethernet Bridging (VEB) functions, Virtual Ethernet Port Aggregation (VEPA) functions, VNTag functions, and/or any other Network Interface Virtualizer (NIV) functions. Network adapter-based switching functions may comprise embedded Switch (eSwitch) functions, Virtual Ethernet Bridging (VEB) functions, Virtual Ethernet Port Aggregation (VEPA) functions, VNTag functions, and/or any other NIV functions. The configuration of the logical switches may be based on vertical and/or horizontal combinations of the switching functions. Vertical combinations may comprise combining at least a hypervisor-based switching function and a network adapter-switching function in a single logical switch. Horizontal combinations may comprise combining hypervisor-based switching functions, combining network adapter-switching functions, and/or combining network switch-based switching functions in a single logical switch.

The local manager may also provide interfacing services to enable exposing of configured logical switches, to management entities external to the local networking domain, for example. The interfacing services may comprise an internal interface, which may be utilized, via the local manager, to configure the constituent switching functions and/or to forward/receive messages to/from the logical switches. The interfacing services may also comprise a uniform external interface, which may enable external entities, such as remote management entities for example, to manage and/or interact with the configured logical switches.

Figure 1:
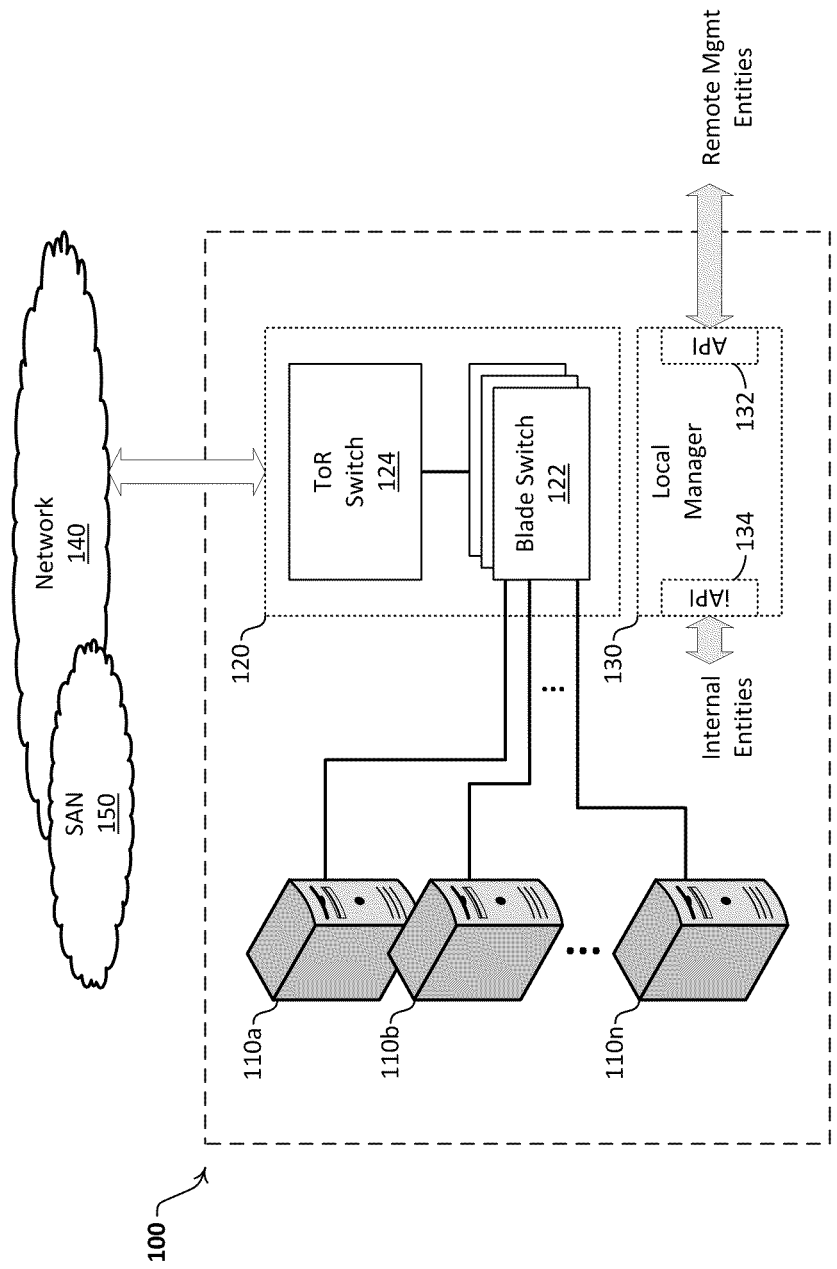
FIG. 1 is a block diagram illustrating an exemplary local networking domain comprising network devices and switching devices, which may be utilized in accordance with an embodiment of the invention.

FIG. 1 is a block diagram illustrating an exemplary local networking domain comprising network devices and switching devices, which may be utilized in accordance with an embodiment of the invention. Referring to FIG. 1, there is shown a local networking domain 100 comprising a plurality of network devices 110a, 110b, . . . , 110n, a network switching system 120, and a local manager 130. Also shown in FIG. 1 are an external network 140 and a storage area network (SAN) 150.

The local networking domain 100 may comprise plurality of devices and/or entities, which may be inter-connected, directly and/or via other devices and/or entities within the local networking domain 100, and/or may be administered and/or managed by a single entity, such as the local manager 130.

Each of the network devices 110a, 110b, . . . , 110n may comprise suitable logic, circuitry, interfaces, and/or code that may be operable to perform various tasks and/or execute applications based on, for example, preloaded instructions and/or user input. Exemplary network devices may comprise a server, a personal computer (PC), a laptop, a smart phone, and/or handheld mobile device. Each of the network devices 110a, 110b, . . . , 110n may communicate data and/or messages during performance of tasks and/or execution of applications. In this regard, the network devices 110a, 110b, . . . , 110n may transmit and/or receive data, via the network switching system 120, within and/or external to the local networking domain 100. The network devices 110a, 110b, . . . , 110n may utilize network links for communicating with the network switching system 120. In this regard, the network links used by network devices 110a, 110b, . . . , 110n may comprise Ethernet links, such as 10 Gigabit Ethernet (10 GbE) links.

The network switching system 120 may comprise suitable logic, circuitry, interfaces, and/or code for performing switching and routing of information within and/or external to the local networking domain 100. The network switching system 120 may comprise, for example, a plurality of switches. For example, the network switching system 120 may comprise one or more blade switches 122 and a top-of-rack (ToR) switch 124. The switching system 100 may enable exchange of data among the network devices 110a, 110b, . . . , 110n. The network switching system 120 may also provide external routing of data communicated by the network devices 110a, 110b, . . . , 110n, to and/or from the network 140 and/or the SAN 150 for example. Switching operations may be performed by one or more networking layers based on, for example, the Open Systems Interconnection (OSI) Model. For example, the network switching system 120 may be operable to perform L2, L3, L4, VLAN, and/or any other higher and/or additional protocol layer based switching. In an exemplary aspect of the invention, the network switching system 120 may also provide internal routing within the local networking domain 100, to enable and/or support data and/or messages communication internally within the local networking domain 100, among the network devices 110a, 110b, ..., 110n for example.

The local manager 130 may comprise suitable logic, circuitry, interfaces, and/or code that may be operable to manage and/or control operations of one or more devices and/or entities with which it is associated. The local manager 130 may be utilized to configure and/or manage one or more devices of the local networking domain 100, such as the network devices 110a-110n and/or the network switching system 120. In this regard, the local manager 130 may configure, control, and/or manage, for example, data communication and/or switching operations in and/or external to the local networking domain 100. While the local manager 130 is shown as a separate component within the local networking domain 100, the invention need not be so limited. For example, the functionality and/or operations described herein with regard to the local manager 130 may be performed by other components of the local networking domain 100, such as one or more of the blade switches 122 and/or the ToR switch 124.

The local manager 130 may also be operable to support management of associated devices by one or more external and/or dedicated network management entities (e.g. used by remote administrators) by, for example, exposing one or more application programming interface (APIs) 132 to the network management entities for interacting with devices and/or entities in the local networking domain 100 that are associated with the local manager 130. In this regard, the local manager 130 may be operable to translate between the API 132 and one or more network interfaces. For example, the local manager 130 may be operable to receive a command or request over a network interface and may de-packetize, convert, reformat, and/or otherwise process the command or request to generate a corresponding command or request on one or more APIs to one or more devices. The local manager 130 may also expose an internal API (iAPI) 134 which may be utilized within the local networking domain 100, generally in the same fashion, for management related interactions with and/or among devices associated with the local manager 130 within the local networking domain 100.

The network 140 may comprise a system of interconnected networks and/or devices which may enable exchange of data and/or messages among a plurality of nodes, based on one or more networking standards, including, for example, Internet Protocols (IP). The network 140 may comprise a plurality of broadband capable subnetworks, which may comprise, for example, satellite networks, cable networks, DVB networks, the Internet, and/or other local or wide area network. These subnetworks may collectively enable conveying data, via Ethernet packets for example, to plurality of end users. In this regard, physical connectivity within, and/or to or from the network 140, may be provided via copper wires, fiber-optic cables, wireless interfaces, and/or other standards-based interfaces. The SAN 150 may comprise one or more remote storage resources. In this regard, the SAN 150 may comprise network of storage devices, which may be remotely accessed and/or utilized (for storage) by network devices, such the network devices 110a-110n, wherein the storage devices of the SAN 150 may be presented as locally attached storage resources to operating systems (OS) and/or virtual machines (VMs) running in the network devices. The network devices 110a, 110b, ..., 110n may obtain external networking connectivity, via the network switching system 120 for example, to access the network 140 and/or the SAN 150.

In operation, the local networking domain 100 may provide various services to support applications and/or processes running and/or executing in the network devices 110a, 110b, ..., 110n. In this regard, the local networking domain 100 may enable communicating data and/or messages from and/or to the network devices 110a, 110b, ..., 110n, within the local networking domain 100 and/or external to it. Switching operations may be performed in the local networking domain 100 to facilitate these data communications from and/or to the network devices 110a-110n. For example, the network switching system 120 may route and/or forward packets from and/or to the network devices 110a-110n. In this regard, the packets may be received from and/or send to the network devices 110a-110n via one or more the blade switches 122. Furthermore, packets received from and/or destined for external entities, accessed via the network 140 for example, may be routed via the ToR switch 124.

In an exemplary aspect of the invention, switching may also be provided internally within at least some of the network devices 110a-110n, in addition to network switch-based switching functions, which may be provided via the blade switches 122 and/or the ToR switch 124. In this regard, hardware and/or software components of the network devices 110a-110n may be configured to provide data switching and/or routing within the network devices 110a-110n. For example, the network device 110a may comprise a network interface controller (NIC) to provide network access capabilities. Furthermore, in instances where the network device 110a is implemented as a virtualized platform, comprising a plurality of virtual machines (VMs), the network device 110a may comprise a hypervisor, which may comprise a software partition that enables interactions between at least some of the VMs running in the network device 110a and resources (e.g. the NIC) available in the network device 110a. Accordingly, NICs and/or hypervisors may be configured to support switching and/or routing within the network device 110a, between at least a portion of the VMs running therein. In this regard, the NIC may be configured and/or may comprise sub-components for providing NIC-based switching. In this regard, NIC-based switches may implement eSwitch, Virtual Ethernet Bridging (VEB), Virtual Ethernet Port Aggregation (VEPA), VNtag, and/or any other NIV protocol based switching. The hypervisor may also be configured and/or may comprise sub-components for providing hypervisor-based switching. In this regard, the hypervisor may comprise virtual switch (vSwitch) functionality.

In various exemplary embodiments of the invention, a plurality of logical switches may be configured in the local networking domain 100, by the local manager 100 for example, using various switching functions available in the local networking domain 100. In this regard, the switching functions may comprise hypervisor-based switching functions, NIC-based switching functions, and/or network switch-based switching functions. Furthermore, the local manager 130 may be utilized to abstract the details of each of the configured logical switches, to aggregate the capabilities of constituent switching functions for each logical switch, and/or present the configured logical switches as singular entities to, for example, management entities, which may interact with, configure, and/or utilize these switches. The API 132 and/or the iAPI 134 may be configured and/or utilized, for example, to provide uniform internal and/or external switching-related interface services, among the configured logical switches configured in the local networking domain and/or between the configured logical switches and other entities within or external to the local networking domain 100.

The logical switches may be configured using, for example, vertical and/or horizontal combinations of switching functions that may exist in one or more of the network devices 110a-110n and/or in one or more of the blade switches 122 or the ToR switch 124. In this regard, "vertical" combination may refer to combinations comprising switching functions operating at different levels, such as hypervisor-based, NIC-based, or network switch-based switching function. "Horizontal" combination may refer to combinations comprising switching functions operating at the same level, such as hypervisor-based, NIC-base, or network switch-based switching function, but in different machines, such as hypervisor-based or NIC-based switching functions in different network devices 110a-110n, or network switch-based switching functions operating in, for example, different blade switches 122.

In an exemplary vertical combination, for example, network switch-based switching function may be combined with both a hypervisor-based switching function and a NIC-based switching function, and all three functions may be exposed by the local manager 130 as a singular logical switch. In this regard, a network switch, such as the blade switch 122 and/or the ToR switch 124 may be utilized control operations of the NIC-based switching function and the hypervisor-based switch. In another exemplary vertical combination, only the hypervisor-based switching function and the NIC-based switching function may combined, and they may be controlled and exposed as a single switch that is different from the network switch-based switching function that may run below it.

In an exemplary horizontal combination, all the hypervisor-based switching functions and the NIC-based switching functions in at least some of the network devices 110a-110n may be combined and exposed, to network administrators for example, as a single logical switch. Furthermore, the network switch-based switching functions corresponding to and/or servicing those network devices may also be combined and exposed as another logical switch. In another exemplary horizontal combination, all the hypervisor-based switching functions and all the NIC-based switching functions in at least some of the network devices 110a-110n, and all the network switch-based switching functions corresponding to and/or servicing those network devices may be combined and exposed as a single logical switch. In yet another exemplary horizontal combination, all the NIC-based switching functions in at least some of the network devices 110a-110n and all the network switch-based switching functions corresponding to and/or servicing those network devices may be combined and exposed as a single logical switch; and all the hypervisor-based switching functions in those devices may be combined into and exposed as another logical switch.

Figure 2A:
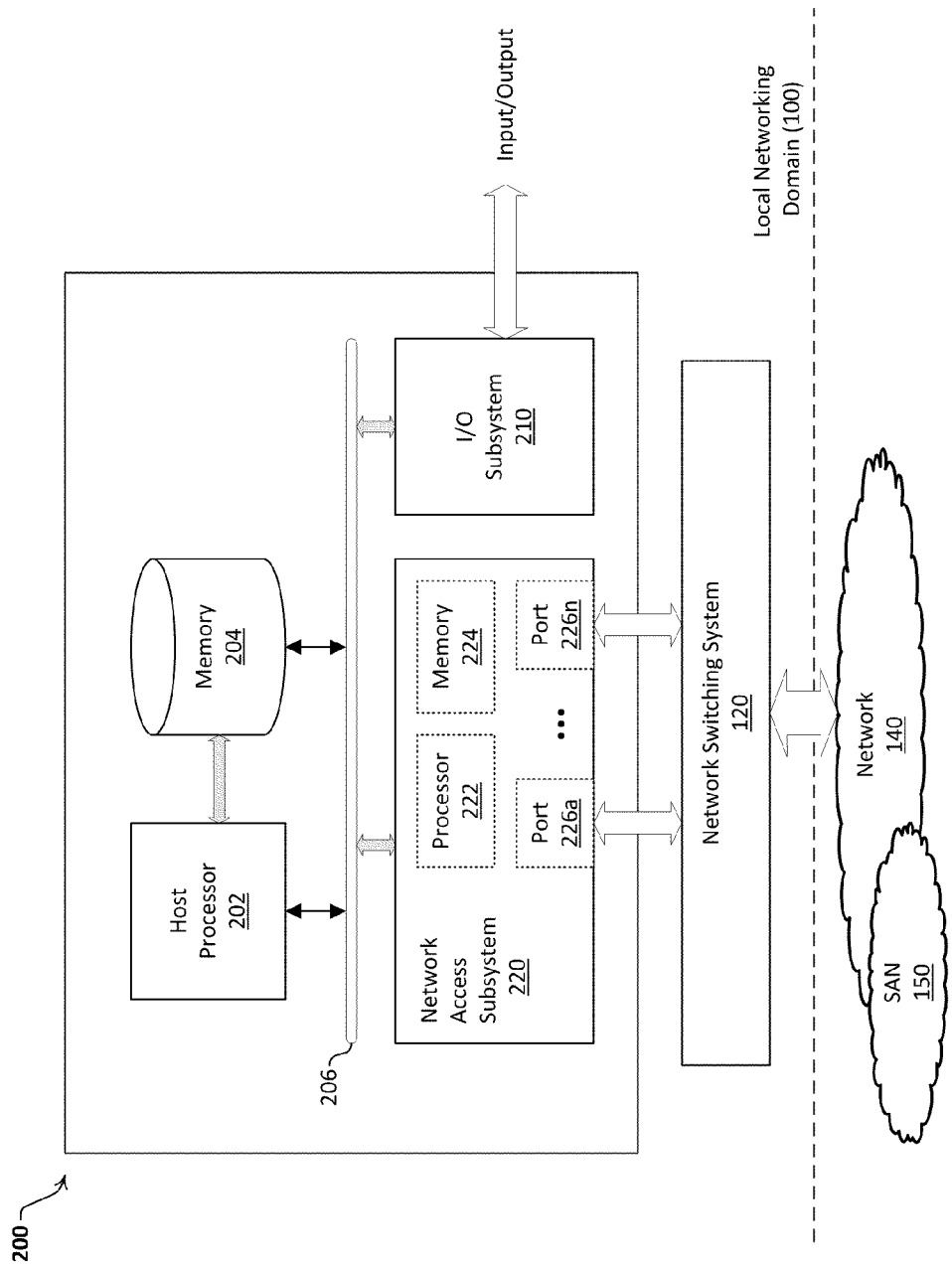
FIG. 2A is a block diagram illustrating an exemplary network device, which may support switching operations in a local networking domain, in accordance with an embodiment of the invention.

FIG. 2A is a block diagram illustrating an exemplary network device, which may support switching operations in a local networking domain, in accordance with an embodiment of the invention. Referring to FIG. 2A, there is shown a network device 200, a host subsystem 202, a system bus 206, an input/output (I/O) subsystem 210, and a network access subsystem 220. Also shown in FIG. 2A is the network switching system 120, the network 140, and the SAN 150 of FIG. 1.

The network device 200 may correspond to one or more of the network devices 110a, 110b, . . . , 110n of FIG. 1. The network device 200 may comprise the host processor 202, the host memory 204, the system bus 206, the I/O subsystem 210, and/or the network access subsystem 220. In this regard, the host processor 202 may provide overall control and/or management of the operations of the network device 200; the I/O subsystem 210 may enable user interactions with the network device 200; and the network access subsystem 220 may enable communication of data and/or messages from and/or to the network device 200, when executing various tasks and/or applications. The network device 200 may also comprise other hardware resources (not shown) such as a graphics card and/or a peripheral sound card, for example.

The host processor 202 may comprise suitable logic, circuitry, interfaces and/or code that may be operable to process data, and/or control and/or manage operations of the network device 200, and/or tasks and/or applications performed therein. In this regard, the host processor 202 may be operable to configure and/or control operations of various components and/or subsystems of the network device 200, by utilizing, for example, one or more control signals. The host processor 202 may also control data transfers within the network device 200. The host processor 202 may enable execution of applications, programs and/or code, which may be stored in the host memory 204 for example. The host memory 204 may comprise suitable logic, circuitry, interfaces and/or code that enable permanent and/or non-permanent storage and/or fetching of data, code and/or other information used in the network device 200. In this regard, the host memory 204 may comprise different memory technologies, including, for example, read-only memory (ROM), random access memory (RAM), and/or Flash memory. The host memory 204 may store, for example, configuration data, which may comprise parameters and/or code, comprising software and/or firmware, but the configuration data need not be limited in this regard.

The system bus 206 may comprise suitable logic, circuitry, interfaces, and/or code that may enable exchange of data and/or messages between various components and/or systems in the network device 200. In this regard, the system bus may comprise parallel or serial, and/or internal or external based bus technologies, and/or any combinations thereof. Exemplary system bus interfaces may comprise Inter-Integrated Circuit (I²C), Universal Serial Bus (USB), Advanced Technology Attachment (ATA), Small Computer System Interface (SCSI), Peripheral Component Interconnect (PCI), and/or Peripheral Component Interconnect Express (PCI-e) based interfaces.

The I/O subsystem 210 may comprise suitable logic, circuitry, interfaces, and/or code that may enable inputting and/or outputting data and/or messages, to support user interactions with the network device 200, to receive user input and/or provide user output. For example, the I/O subsystem 210 may facilitate interactions with the network device 200 via one or more I/O devices, such as a monitor, a mouse, and/or keyboard.

The network access subsystem 220 may comprise suitable logic, circuitry, interfaces, and/or code that may be operable to communicate data and/or messages from and/or to the network device 200. The network access subsystem 220 may comprise, for example, a network interface controller or chip (NIC). The network access subsystem 220 may comprise, for example, the networking processor 222, the networking memory 224, and/or the plurality of ports 226a-226n. The networking processor 222 may comprise suitable logic, circuitry, interfaces, and/or code for controlling and/or managing operations of the network access subsystem 220. The networking memory 224 may comprise suitable logic, circuitry, interfaces and/or code for dedicated local storage and/or buffering of data within the network access subsystem 220. In this regard, the networking memory 224 may comprise one or more ROM and/or RAM memory devices. Each of the plurality of ports 226a-226n may comprise suitable logic, circuitry, interfaces, and/or code for providing network interfacing functionality, in the network access subsystem 220, based on one or more networking standards and/or protocols. The plurality of ports 226a-226n may comprise, for example, 10 GbE ports. The network access subsystem 220 may support and/or perform, for example, physical (PHY) layer related access, via the plurality of ports 226a-226n, and/or processing therefor. The network access subsystem 220 may also perform at least some switching, such as layer 2 (L2) based switching for example, during transmission and/or reception of data packets. The switching supported by the network access subsystem 220, however, need not be limited to L2, and may comprise L2, L3, L4, VLAN, and/or other protocol layer. In an exemplary aspect of the invention, the network access subsystem 220 may support inter-VM switching within the network device 200. In this regard, the network access subsystem 220 may be configured to support switching operations based on, for example, eSwitch, VEB, VEPA, VNtag, and/or other NIV protocols.

In operation, the network device 200 may be integrated into a local networking domain, such as the local networking domain 100 of FIG. 1. The network device 200 may be utilized therein to execute applications and/or processes, via the host processor 202 for example. Some of the applications and/or processes executed by the network device 200 may be triggered by and/or may require user input and/or output, which may be received and/or provided via the I/O subsystem 210, for example. During its operations in the local networking domain 100, the network device 200 may transmit and/or receive data and/or messages, via the network access subsystem 210, for example. Data and/or messages communicated by the network device 200 may be transmitted and/or received, for example, via network links, which may be utilized through one or more of plurality of ports 226a-226n. The data and/or messages may routed and/or switched via the network switching system 120 of the local networking domain 100, using one or more of blade switches 122 and/or the ToR switch 124 for example, to enable exchanging of data and/or message between the network device 200 and devices or entities within or external to the local networking domain 100.

In an exemplary aspect of the invention, the network device may be configured as a virtual platform. In this regard, the host processor 202 may be utilized, for example, to run a plurality of VMs. Furthermore, a hypervisor (HV) may be run and/or used, via the host processor 202 for example, to support operations of the VMs. In this regard, the hypervisor may be used to enable at least some of the VMs to interact with some of the physical resources in the network device 200, such as the network access subsystem 220. Furthermore, the hypervisor may also support inter-VM switching within the network device 200. In this regard, vSwitch based switching may be provided, for example, to enable routing of messages and/or data between at least some of the VMs that may run in the network device 200.

In various embodiments of the invention, logical switches may be configured by combining switching functions available in the network device 100 and/or external devices, such as the network switches in the network switching system 120. In this regard, these logical switches may comprise hypervisor-based switching functions and/or NIC-based switching functions, which may be available within the network device 200, and/or network switch-based switching functions, which may be available via the network switching system 120 for example. These logical switches may also comprise switching functions available in other network devices, which may also be configured as virtual platforms.

Figure 2B:
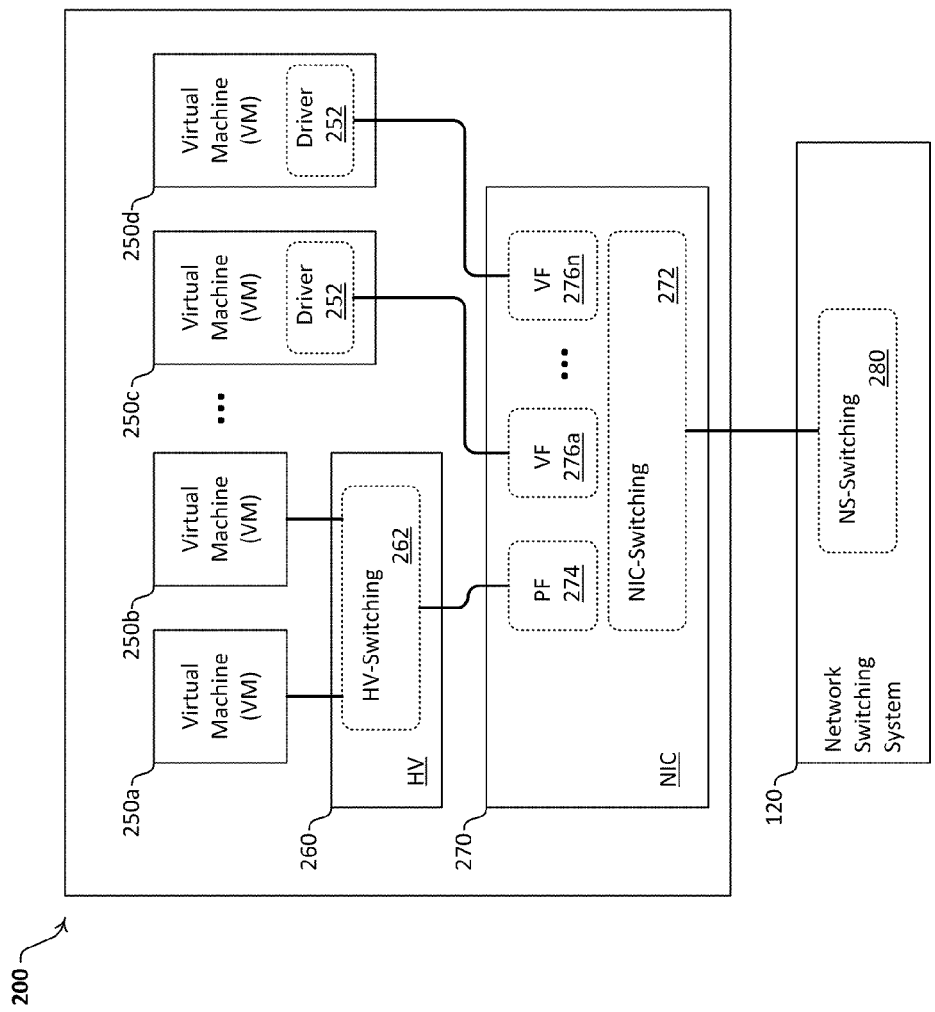
FIG. 2B is a block diagram illustrating an exemplary architecture for a network device that supports switching operations in a virtualized environment, in accordance with an embodiment of the invention.

FIG. 2B is a block diagram illustrating an exemplary architecture for a network device that supports switching operations in a virtualized environment, in accordance with an embodiment of the invention. Referring to FIG. 2B, there is shown the network device 200 when implemented a virtual platform. In this regard, the network device 200 may comprise a plurality of virtual machines (VMs) 250, of which VMs 250a, 250b, 250c, and 250d are shown. Also shown in FIG. 2B is a hypervisor 260 and a network interface controller (NIC) 270.

Each of the plurality of virtual machines (VMs) 250 may comprise a software implementation that may execute and/or perform programs, applications, and/or processes which may typically be executed and/or performed by physical machines, such as a computer. In this regard, each of the plurality of VMs 250 may function as separate operating system (OS). Accordingly, each of the plurality of VMs 250 may enable running and/or execution of various operations or services, independently in the network device 200. Exemplary applications may comprise software applications, email server operations, database server operations, and/or content server operations.

The hypervisor (HV) 260 may comprise suitable logic, code, interfaces, and/or circuitry that may be utilized in a virtualized environment to support one or more virtual machines (VMs) that may run concurrently on a single physical platform. In this regard, the hypervisor 260 may correspond to and/or be implemented by various physical and/or virtual components and/or subsystems within the network device 200. The hypervisor 260 may operate as a software layer that may run directly on top of resources in the network device 200, such as the NIC 270, to enable virtualization of the hardware and/or physical resources of the network device 200. In an exemplary aspect of the invention, the hypervisor 260 may also comprise a dedicated hypervisor-based (HV-based) switching function 262, such as a virtual switch (vSwitch), which may be operable to provide inter-VM connectivity and/or external connectivity to at VMs. In this regard, the HV-based switching function 262 may provide switching services to VMs, such as VMs 252a and 252b, which may not be capable of being directly coupled to hardware resources in the network device, such as the NIC 270. Accordingly, the HV-based switching function 262 may be operable to route and/or forward messages and/or data between VMs 252a and 252b, and/or between each of these VMs and the NIC 270.

The NIC 270 may comprise suitable logic, circuitry, interfaces, and/or code which may be operable to provide network access and/or data communication, originating from and/or destined for other components in the network device 200, substantially as described with regard to the network access subsystem 220 in, for example, FIG. 2A. In this regard, the NIC 270 may transmit and receive data in adherence with one or more networking standards. With reference to the OSI model, the NIC 270 may implement physical layer functions, data link layer functions, and, in some instances, functions associated with OSI layer 3 and higher OSI layers. Similarly, with reference to the TCP/IP model, the NIC 270 may be operable to implement network interface layer functions, Internet layer functions, and, in some instances, transport layer functions and application layer functions. The NIC 270 may, for example, communicate in adherence with one or more Ethernet standards defined in IEEE 802.3. In this regard, the NIC 270 may enable transmission and/or reception of data in the form of Ethernet or other types of packets.

In an exemplary aspect of the invention, the NIC 270 may support virtualization of the network device 200. In this regard, the NIC 270 may be configurable and/or may comprise components and/or function that support operations of the plurality of VMs 250 in the network device 200. For example, the NIC 270 may comprise a physical function (PF) 274 and/or one or more virtual functions (VF) 276a-276n, which may be operable to support direct and/or indirect interactions with the plurality of VMs 250. The NIC 270 may also comprise a NIC-based switching function 272. The NIC-based switching function 272 may comprise suitable logic, circuitry, interfaces, and/or code operable to provide and/or support switching between VMs running within the network device 200 based on one or more standards/protocols, such as VEB, VEPA, VNTag, and/or other NIV protocols. In this regard, certain standards/protocols, such as VEB for example, may enable inter-VM communication without the aid of an external network switch, whereas other standards/protocols, such as VEPA for example, may only enable providing inter-VM communication via a specialized external network switch.

In operation, the network device 200 may be configured as a virtual platform. In this regard, the network device 200 may enable running of the plurality of VMs 250 via, for example, the host processor 202. The network device 200 may also run the hypervisor 260 to enable interactions between the VMs 250 and resources in the network device 200, such as the NIC 270. In an exemplary aspect of the invention, switching services may be provided in and/or to the network device 200. In this regard, internal switching functions, such as the HV-based switching function 262 and/or the NIC-based switching function 272 for example, and/or external switching function, such as the network switch-based (NS-based) switching function 280, which may be provided via one or more network switches in the network switching system 120 for example, may be utilized to route and/or forward messages and/or data between the VMs 250, and/or between the VMs 250 and other entities residing with the local networking domain 100 or external to it, which may be accessed via the network 140 and/or the SAN 150.

In various embodiments of the invention, logical switches may be configured by combining switching functions available in the network device 200 and/or external devices, such as the network switches in the network switching system 120. In this regard, the logical switches may comprise the HV-based switching function 262 and/or NIC-based switching function 272, which may be combined with corresponding switching functions in other, similarly configured network devices, and/or NS-based switching functions 280, which may be available via the network switching system 120.

Figure 3A:
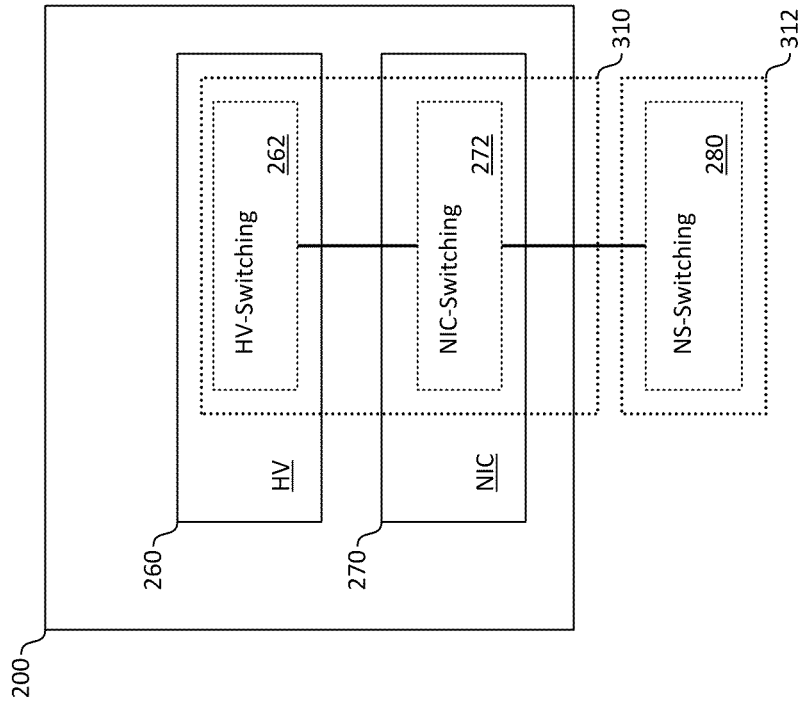
FIGS. 3A and 3B are block diagrams illustrating various exemplary vertical combinations of switching levels including virtualization related switching functions in a network device in a local networking domain, in accordance with an embodiment of the invention.
Figure 3B:
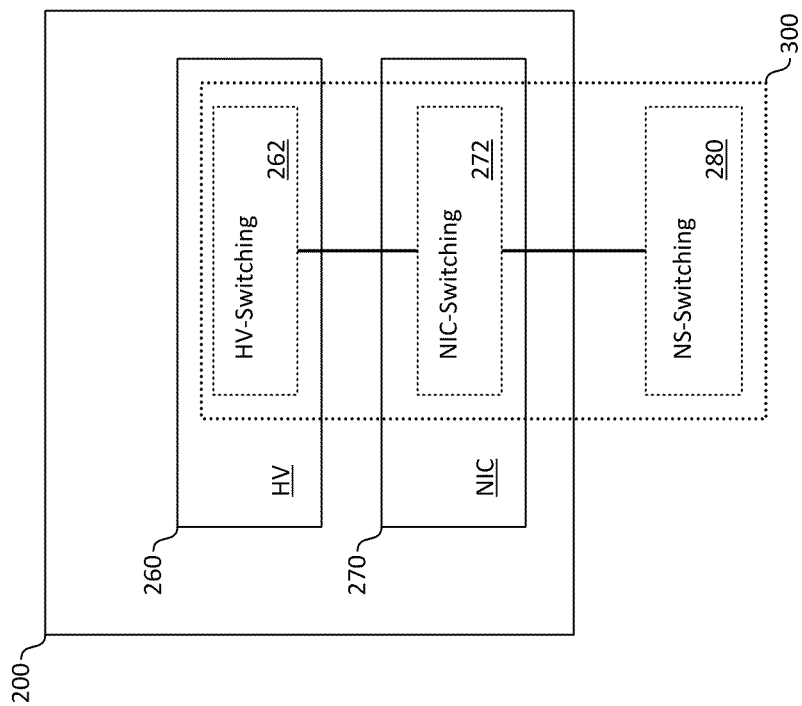

FIGS. 3A and 3B are block diagrams illustrating various exemplary vertical combinations of switching levels including virtualization related switching functions in a network device in a local networking domain, in accordance with an embodiment of the invention. Referring to FIG. 3A, there is shown logical switch 300, which may comprise a vertical combination of the HV-based switching function 262, the NIC-based switching function 272, and the NS-based switching function 280. Referring to FIG. 3B, there is shown logical switches 310 and 312. The logical switch 310 may comprise a vertical combination of the HV-based switching function 262 and the NIC-based switching function 272. The logical switch may comprise the NS-based switching function 280.

In the scenario depicted in FIG. 3A, the local manager 130 may configure the logical switch 300 by combining the HV-based switching function 262, the NIC-based switching function 272, and the NS-based switching function 280. In this regard, the local manager 130 may communicate with the hypervisor 260, the NIC 270, and one or more network switches in the network switching system 120, such as the ToR switch 124 and/or one or more blade switches 122, via the iAPI 134, to facilitate the creation of the logical switch 300. The local manager 130 may utilize communication via the iAPI 134 for capability exploration, reporting statistics and errors, obtaining and/or assigning configuration (e.g. MAC addresses, VLAN tags, and/or switching modes), and/or obtaining and/or assigning VM related switching servicing related information (e.g. VM handing off, mirroring, and/or VM-HV interaction related parameters, such as VF or PF assignment). This may enable the local manager 130 to coordinate operations of these devices and/or components such to ensure that data may be routed and/or forwarded via the HV-based switching function 262, the NIC-based switching function 272, and the NS-based switching function 280 consistently, properly, and/or seamlessly. The local manager 300 may provide, for example, routing parameters to these components to ensure that the data sent from and/or targeted for serviced virtual machines (VMs) in the network device 200 traverses these components based on, for example, preconfigured paths, bandwidths, speeds, quality, and/or switching mode.

Accordingly, the local manager 130 may expose the combined operations of the HV-based switching function 262, the NIC-based switching function 272, and the NS-based switching function 280 as switching servicing corresponding to singular entity, the logical switch 300. In this regard, the local manager 130 may enable external entities, such as remote management consoles for example, to interact with the logical switch 300 via the API 132. The remote management consoles may communicate with the logical switch 300 as if it was a single network switch. These external management interactions may pertain to platform migrations, capabilities inquiries and/or adjustments, and status indications. The local manager may receive management messages destined for the logical switch 300, and may process these messages to determine appropriate actions that may be taken to perform any requests included therein. In this regard, the local manager 130 may determine necessary modifications and/or updates to configuration, management, and/or control of hypervisor 260 and/or the HV-based switching function 262 therein, the NIC 270 and/or the NIC-based switching function 272 therein, and/or the NS-based function 280 and/or network switches providing that function. These changes may be performed using internal management messages that may communicated via the iAPI 134.

In the scenario depicted in FIG. 3B, the local manager 130 may configure the logical switches 310 and 312 using vertical combinations based on the HV-based switching function 262, the NIC-based switching function 272, and the NS-based switching function 280. In this regard, the local manager 130 may combine the HV-based switching function 262 and the NIC-based switching function 272 to create the logical switch 310, and may configure the logical switch 312 based on the NS-based switching function 280. Configuration of the logical switches 310 and 312 may be performed in similar manner as with configuring the logical switch 300, substantially as described with regard to the scenario depicted in FIG. 3A. The logical switches 310 and 312 need not, however, be configured identically. Rather, dissimilar feature sets, control, and/or switching parameters may be used and/or applied to the logical switches 310 and 312 as if they were different physical switches. The local manager 130 may also configure, manage, and/or control interactions between the logical switches 310 and 312 during switching operations and/or servicing. In this regard, the local manager 130 may configure the logical switches 310 and 310 to interact in similar fashion as two physical switches may be interact during traffic routing and/or forwarding operations in a network.

Figure 4A:
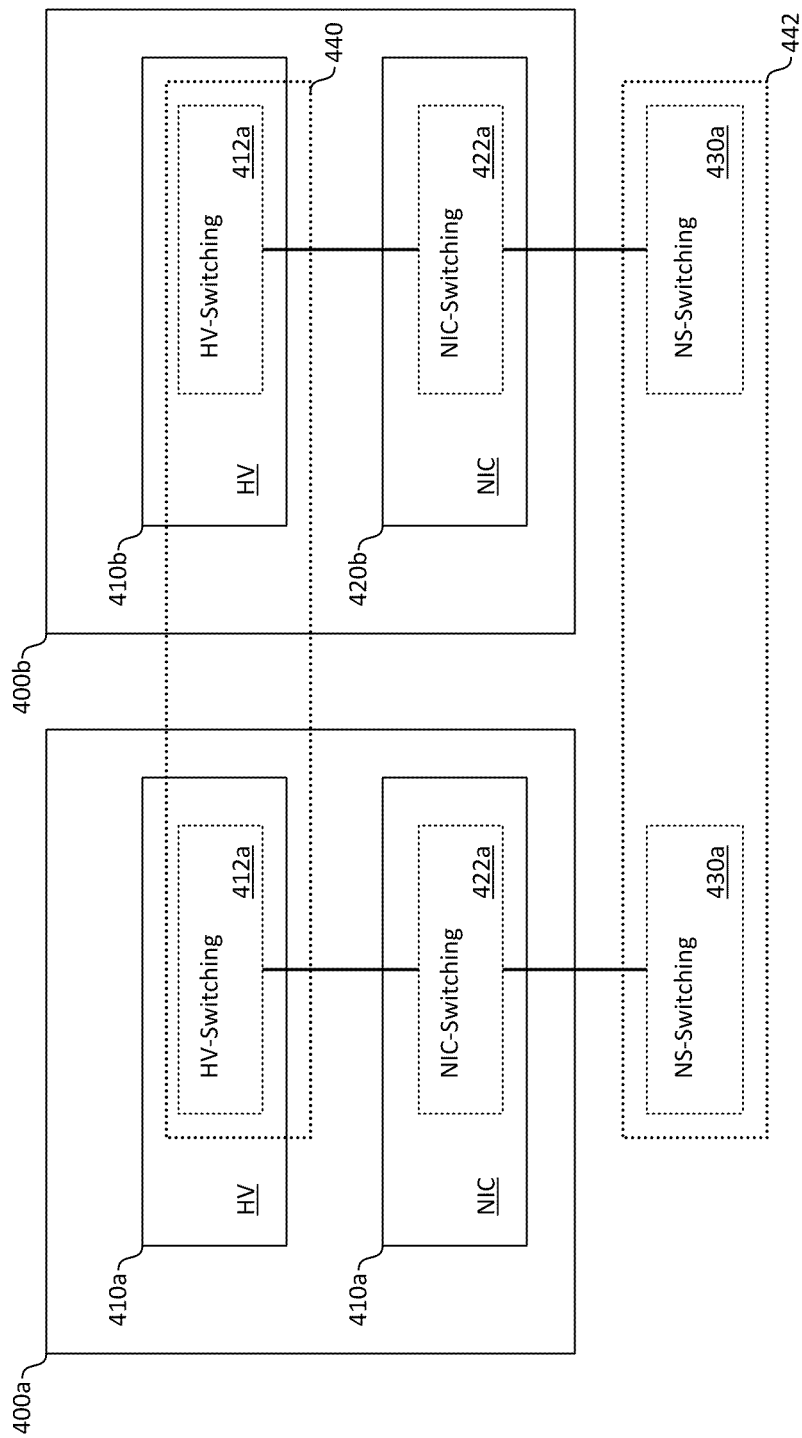
FIG. 4A is a block diagrams illustrating exemplary horizontal combination of switching levels including virtualization related switching functions in multiple network devices in a local networking domain, in accordance with an embodiment of the invention.

FIG. 4A is a block diagrams illustrating exemplary horizontal combination of switching levels including virtualization related switching functions in multiple network devices in a local networking domain, in accordance with an embodiment of the invention. Referring to FIG. 4A, there is shown network devices 400a and 400b, each of which may be similar to the network device 200, substantially as described with regard to FIGS. 2A and 2B.

The network devices 400a and 400b may comprise NICs 420a and 420b, respectively, each of which may similar to the NIC 270 of the network device 200 substantially as described with regard to, for example, FIG. 2B. In this regard, each of the NICs 420a and 420b may provide network access functionality in the network devices 400a and 400b, respectively. In instances where the network devices 400a and 400b are configured as virtualized platforms, the network devices 400a and 400b may comprise hypervisors (HVs) 410a and 410b, respectively, each of which may similar to the HV 260 of the network device 200 substantially as described with regard to, for example, FIG. 2B. In this regard, the HVs 410a and 410b may support interactions between virtual machines (VMs) running in the network devices 400a and 400b, respectively, and resources in the network devices 400a and 400b, respectively, such as the NICs 420a and 420b.

Each of the network devices 400a and 400b may be supported by the network switch-based (NS-based) switching function, such as the NS-based switching functions 430a and 430b, respectively, each of which may be similar to the NS-based switching function 280, substantially as described with regard to FIG. 2B, for example. In this regard, each of the NS-based switching functions 430a and 430b may be provided by one or more network switches in the network switching system 120, such as the blade switches 122 and/or the ToR switch 124.

In an exemplary aspect of the invention, the network devices 400a and 400b may also comprise virtualization related internal switching functions for routing and/or forwarding data and/or message communicated from and/or to VMs (or applications therein). In this regard, the network devices 400a and 400b may comprise hypervisor-based (HV-based) switching functions 412a and 412b, each of which may be similar to the HV-based switching function 262, substantially as described with regard to FIG. 2B, for example. The network devices 400a and 400b may comprise NIC-based switching functions 422a and 422b, each of which may be similar to the NIC-based switching function 272, substantially as described with regard to FIG. 2B, for example.

In various embodiments of the invention, logical switches may be configured based on horizontal combinations of switching functions corresponding to the network devices 400a and 400b. In the scenario depicted in FIG. 4A, for example, logical switches 440 and 442 may be configured, using the local manager 130 for example, based on horizontal combinations of at least some of the switching functions corresponding to the network devices 400a and 400b. In this regard, the local manager 130 may configure the logical switch 440 and 442, by combining the HV-based switching functions 412a and 412b to create the logical switch 440, and by combining the NS-based switching functions 430a and 430b, to create the logical switch 442. Configuring and/or managing the logical switches 440 and 442, by the local manager 130, may be performed in substantially similar manner as with the logical switch 300, as described with regard to FIG. 3A, for example.

In this regard, the local manager 130 may communicate with, via the iAPI 134 for example, the HVs 410a and 410b to provide the HV-based switching functions 412a and 412b, and/or with one or more network switches providing NS-based switching functions 430a and 430b, to facilitate configuration of the logical switches 440 and 442. The local manager 130 may utilize communication via the iAPI 134 for capability exploration, reporting statistics and errors, obtaining and/or assigning configuration (e.g. MAC addresses, VLAN tags, and/or switching modes), and/or obtaining and/or assigning VM related switching servicing related information (e.g. VM-HV interaction related parameters, such as VF or PF assignment). This may enable the local manager 130 to coordinate and/or combine operations of these devices and/or components during traffic forwarding and/or routing corresponding to switching operations that are to be performed by the logical switches 440 and 442. Accordingly, the local manager 130 may expose the logical switches 440 and 442 as if they were singular entities, which may be managed, for example, using the same interface that may be used to manage and/or interact with physical switches. In this regard, the local manager 130 may enable external entities, such as remote management consoles for example, to interact with the logical switches 440 and 442 via the API 132. The logical switches 440 and 442 need not be configured identically. Rather, dissimilar feature sets, control, and/or switching parameters may be used to setup and/or configure the logical switches 440 and 442 to function as if they were different physical switches. The local manager 130 may also configure, manage, and/or control interactions between the logical switches 440 and 442 during switching operations and/or servicing. In this regard, the local manager 130 may configure the logical switches 440 and 442 to interact in similar fashion as two physical switches may interact during traffic routing and/or forwarding operations in a network.

Figure 4B:
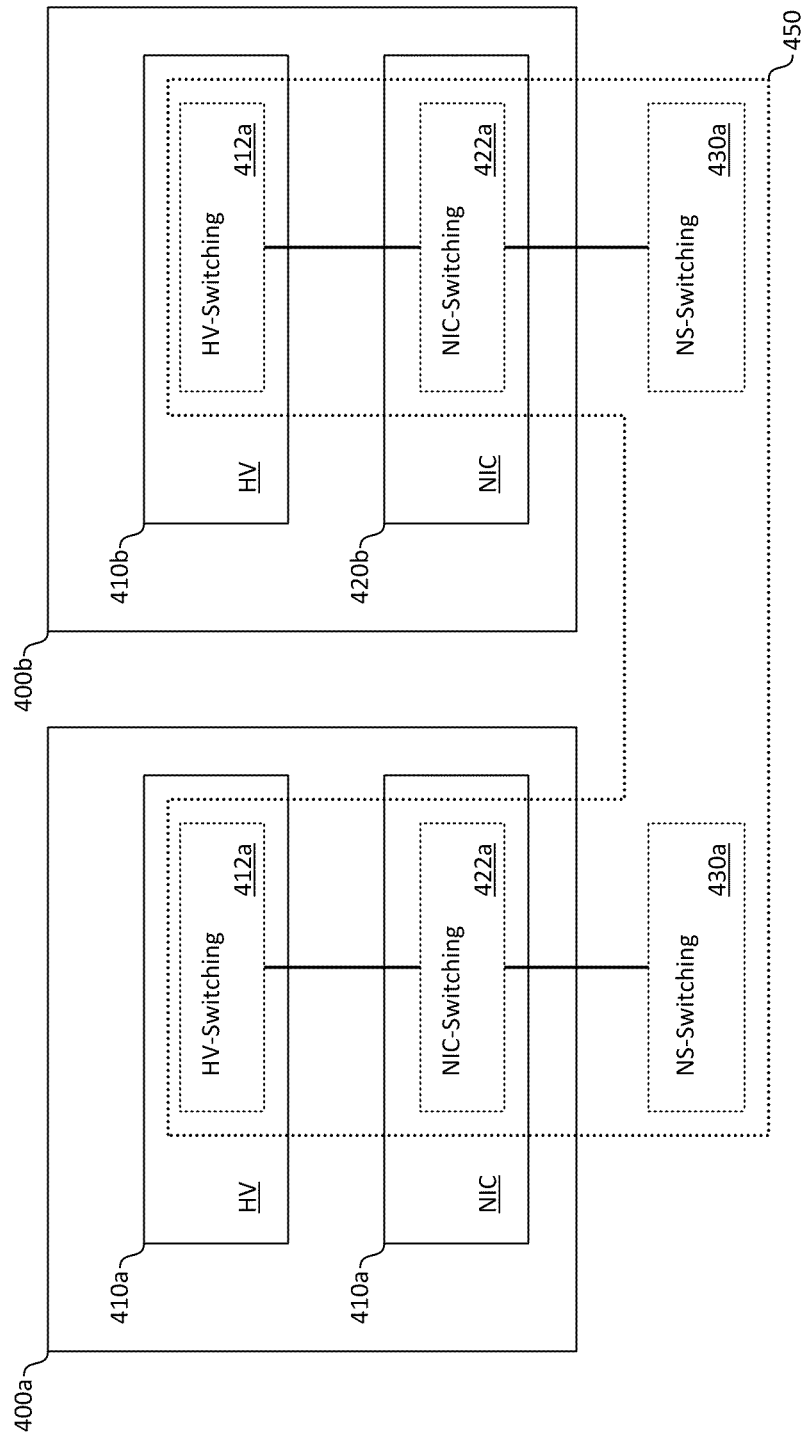
FIGS. 4B, 4C, and 4D are block diagrams illustrating various exemplary horizontal combinations of switching levels including virtualization related switching functions in multiple network devices in a local networking domain, in accordance with an embodiment of the invention.
Figure 4C:
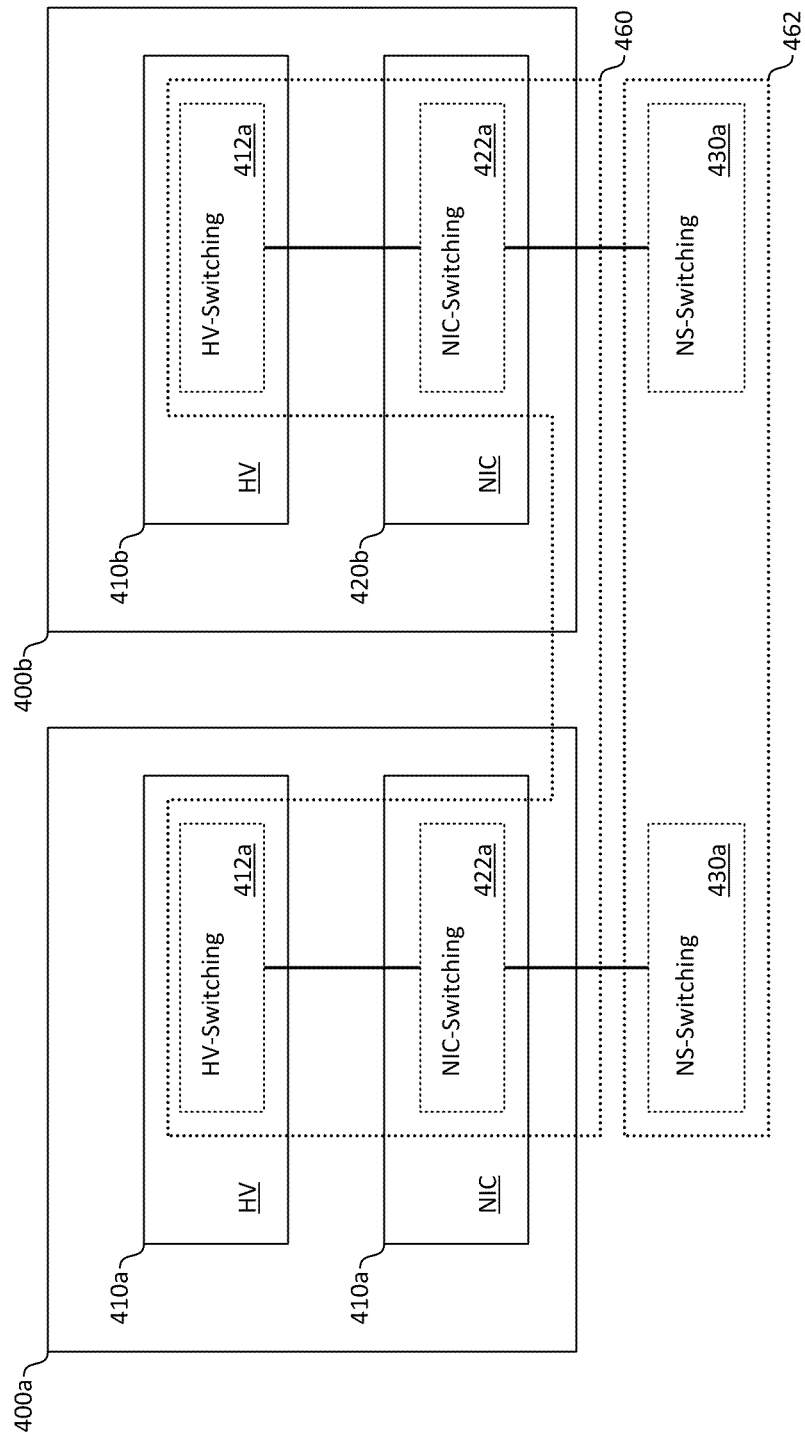
Figure 4D:
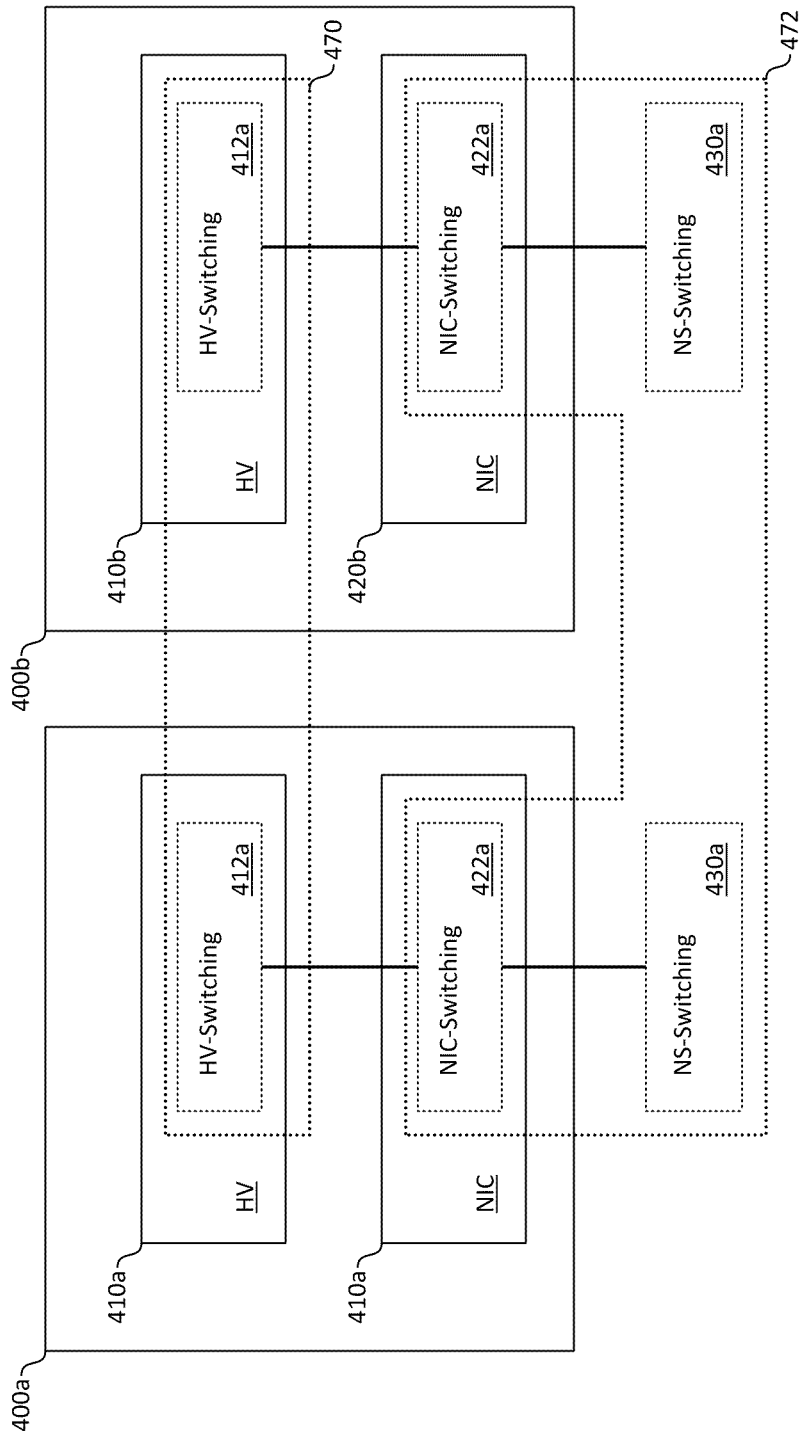

FIGS. 4B, 4C, and 4D are block diagrams illustrating various exemplary horizontal combinations of switching levels including virtualization related switching functions in multiple network devices in a local networking domain, in accordance with an embodiment of the invention. Referring to FIGS. 4B, 4C, and 4D, there are shown various horizontal combinations comprising switching functions in the network devices 400a and 400b and/or the NS-based switching functions 430a and 430b.

In the scenario depicted in FIG. 4B, the local manager 130 may configure the logical switch 450 based on horizontal combination using the network devices 400a and 400b, and the NS-based switching functions 430a and 430b. In this regard, the logical switch 450 may be configured by combining HV-based switching functions 412a and 412b, the NIC-based switching functions 422a and 422b, and the NS-based switching functions 430a and 430b. The local manager 130 may configure, via the iAPI 134, the HVs 410a and 410b, the NICs 420a and 420b, and/or the network switches providing the NS-based switching functions 430a and 430b. This may enable the local manager 130 to coordinate operations of the HV-based switching functions 412a and 412b, the NIC-based switching functions 422a and 422b, and the NS-based switching functions 430a and 430b to enable exposing and/or presenting it a singular switching entity. Accordingly, external management entities may interact with, and manage the logical switch 450 as if it was a single switch. In this regard, the local manager 130 may provide a single point of management interfacing to the logical switch 450, via the API 132 and the iAPI 134, for example.

In the scenario depicted in FIG. 4C, the local manager 130 may configure the logical switches 460 and 462 based on horizontal combinations using the network devices 400a and 400b, and the NS-based switching functions 430a and 430b. In this regard, the logical switch 460 may be configured by combining the HV-based switching functions 412a and 412b with the NIC-based switching functions 422a and 422b into a singular switching entity. The logical switch 462 may be configured by combining the NS-based switching functions 430a and 430b. For example, the local manager 130 may configure the logical switches 460 and 462 by configuring, via the iAPI 134 for example, the HVs 410a and 410b, the NICs 420a and 420b, and/or the network switches providing the NS-based switching functions 430a and 430b. This may enable the local manager 130 to coordinate operations of the HV-based switching functions 412a and 412b with the NIC-based switching functions 422a and 422b with regard to the logical switch 460, and coordinate operations of the NS-based switching functions 430a and 430b with regard to the logical switch 462. The logical switches 460 and 462 need not be configured identically. Rather, dissimilar feature sets, control, and/or switching parameters may be used to configure and/or setup the logical switches 460 and 462. The local manager 130 may also configure, manage, and/or control interactions between the logical switches 460 and 462 during switching operations and/or servicing. In this regard, the local manager 130 may configure the logical switches 460 and 460 to interact in similar fashion as two different physical switches may be interact during traffic routing and/or forwarding operations in a network. Accordingly, the local manager 130 may be able to expose and/or present each of the logical switches 460 and 462 as a singular switching entity. Furthermore, the local manager 130 may enable external management entities to interact with, and/or manage the logical switches 460 and 462 to function as if they were singular physical switches. In this regard, the local manager 130 may provide a single point of management interfacing to the logical switches 460 and 462, via the API 132 and the iAPI 134 for example.

In the scenario depicted in FIG. 4D, the local manager 130 may configure the logical switches 470 and 472 based on horizontal combinations using the network devices 400a and 400b, and the NS-based switching functions 430a and 430b. In this regard, the logical switch 470 may be configured by combining the HV-based switching functions 412a and 412b into a singular switching entity. The logical switch 472 may be configured by combining the NIC-based switching functions 422a and 422b with the NS-based switching functions 430a and 430b into a second singular switching entity. For example, the local manager 130 may configure the logical switches 470 and 472 by configuring, via the iAPI 134 for example, the HVs 410a and 410b, the NICs 420a and 420b, and/or the network switches providing the NS-based switching functions 430a and 430b. This may enable the local manager 130 to coordinate operations of the HV-based switching functions 412a and 412b with regard to the logical switch 470, and coordinate operations of the NIC-based switching functions 422a and 422b with the NS-based switching functions 430a and 430b with regard to the logical switch 472. The logical switches 470 and 472 need not be configured identically. Rather, dissimilar feature sets, control, and/or switching parameters may be used to setup and/or configure the logical switches 470 and 472. The local manager 130 may also configure, manage, and/or control p between the logical switches 470 and 472 during switching operations and/or servicing. In this regard, the local manager 130 may configure the logical switches 470 and 470 to function in a similar fashion as two different physical switches may be interact during traffic routing and/or forwarding operations in a network. Accordingly, the local manager 130 may be able to expose and/or present each of the logical switches 470 and 472 as a singular switching entity. Furthermore, the local manager 130 may enable external management entities to interact with, and/or manage the logical switches 470 and 472 as if they were singular physical switches. In this regard, the local manager 130 may provide a single point of management interfacing to the logical switches 470 and 472, via the API 132 and the iAPI 134 for example.

Figure 5:
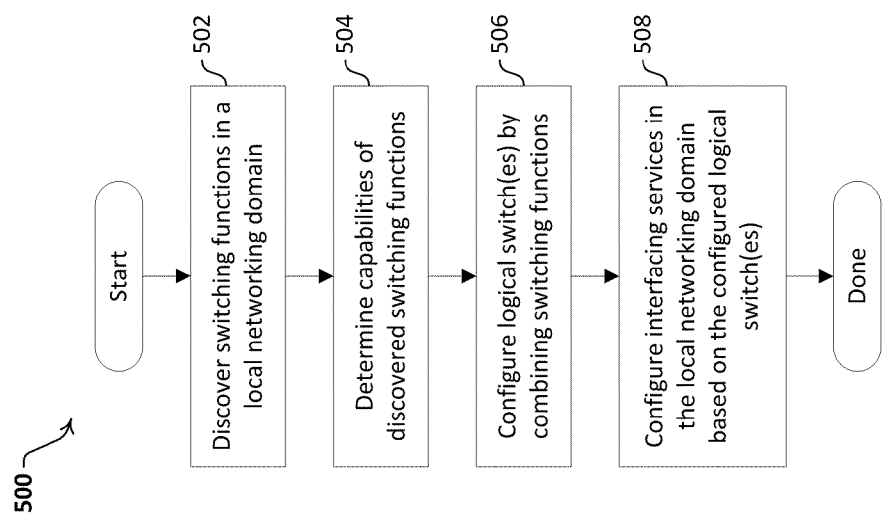
FIG. 5 is a flow chart that illustrates exemplary steps for switching in a virtualized platform, in accordance with an embodiment of the invention.

FIG. 5 is a flow chart that illustrates exemplary steps for switching in a virtualized platform, in accordance with an embodiment of the invention. Referring to FIG. 5, there is shown a flow chart 500 comprising a plurality of exemplary steps that may be performed to enable switching in virtual platforms.

In step 502, switching functions in a local networking domain may be discovered. For example, the local manager 130 may discover the various switching functions provided by the network devices 110a-110n and/or networks switches in the network switching system 120, such as the ToR switch 124 and/or the blade switches 122 for example. In this regard, the switching functions discovered may comprise network switch-based (NS-based) switching functions, such as the NS-based switching functions 280, 430a, and 430b; NIC-based switching functions, such as the NIC-based switching functions 272, 422a, and 422b; and/or hypervisor-based (HV-based) switching functions, such as the HV-based switching functions 262, 412a, and 412b.

In step 504, capabilities of discovered switching functions may be determined. In this regard, the local manager 130 may communicate with discovered switching functions, via the iAPI 134 for example, to determine the switching functions' capabilities, load, and/or limitations. In this regard, the local manager 130 may determine, for each discovered switching function, type and/or level (e.g. L2, L3, and/or L4) of switching supported therein, available bandwidth during switching operations, number and/or type of ports (physical or virtual) available therein, and/or any limitations, such as type of devices and/or entities that maybe serviced thereby. For example, vSwitch function may be limited insofar as that they may only service VMs. In step 506, a plurality of logical switches may be configured by combining at least some of the discovered switching functions. In this regard, the local manager 130 may utilize vertical and/or horizontal combinations, substantially as described with regard to, for example, FIGS. 3A, 3B, and/or 4A-4D. Doing this may enable the local manager 130 to combine operations of at least some of the discovered switching functions such that these combined switching functions may be exposed and/or managed as one or more singular switching entities. In step 508, interfacing services available in the local networking domain may be configured based on the configured logical switches. In this regard, the local manager 130 may configure and/or modify the iAPI 134 and/or the API 132 to enable external entities, such as remote management entities for example, to interact with the configured logical switches as though they were singular switching entities (i.e. as if they where singular physical switches). This may require, for example, processing received and/or transmitted management traffic, via the API 132 in the local manager 130 to and/or from corresponding internal messages used when interacting with the constituent switching functions in the configured logical switches.

Various embodiments of the invention may comprise a method and system for switching in a virtualized platform. The local manager 130 may configure a plurality of logical switches in the local networking domain 100 by combining switching functions available in network devices 110*a*-110*n* and/or network switches in the local networking domain 100. The local manager 130 may run in and/or execute via one or more of the network devices 110*a*-110*n* and/or the network switches in the local networking domain 100. The network switches may comprise one or more blade switches 122 and/or top-of-rack (ToR) switches 124. The switching functions may comprise NS-based switching functions 280, and/or HV-based switching functions 262 or NIC-based switching functions 272 available in network devices which may be configured as virtualized platforms. Hypervisor-based switching functions may comprise a vSwitch functions. Network adapter-based switching functions may comprise eSwitch functions, Virtual Ethernet Bridging (VEB) functions, Virtual Ethernet Port Aggregation (VEPA) functions, NIV function, and/or VNTag functions. The configuration may utilize vertical and/or horizontal combinations of the switching functions. Vertical combinations may comprise combining at least a HV-based switching function 262 and a network adapter-switching function in a single logical switch. Horizontal combinations may comprise combining HV-based switching functions 262, combining network adapter-switching functions, and/or combining NS-based switching functions 280 in a single logical switch. The local manager 130 may also provide interfacing services to enable exposing, configured logical switches. The interfacing services may comprise iAPI 134, which may provide a uniform internal switching-related interface, and which may be utilized, via the local manager 130, to configure the constituent switching functions and/or to forward/receive messages to/from the logical switches. The interfacing services may also comprise the API 132, which may be provide a uniform external switching-related interface, and which may be utilized to enable external entities, such as remote management entities for example, to manage and/or interact with the configured logical switches.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for switching in a virtualized platform.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
with a local manager operating in a network:
identifying a first switching function provided by a first switching element in the network;
identifying a second switching function provided by a second switching element in the network, the first switching element different than the second switching element;
identifying a third switching function provided by a third switching element in the network;
identifying a fourth switching function provided by a fourth switching element in the network, the fourth switching element different than the first, second and third switching elements;
providing, via a first logical switch, the first switching function;
providing, via the first logical switch, the second switching function;
providing, via a second logical switch, the third switching function, and
providing, via the second logical switch, the fourth switching function;
presenting, to a first requester, the first logical switch as a unified entity that includes both the first switching function of the first switching element and the second switching function of the second switching element;
presenting, to a second requester, the second logical switch as a unified entity that includes both the third switching function of the third switching element and the fourth switching function of the fourth element; and
controlling interaction between the first and second logical switches such that the first and second logic switches interact as two separate physical switches.

2. The method of claim 1, wherein identifying the first and second switching functions comprises identifying switching functions in multiple different devices.

3. The method of claim 1, wherein identifying the first and second switching functions comprises identifying switching functions in a common device.

4. The method of claim 1, wherein:
the first switching function comprises a hypervisor function operating in a first network device; and
the second switching function comprises a network interface controller (NIC) function also operating in the first network device.

5. The method of claim 4, wherein
identifying the third switching function comprises operating in a second network device different from the first network device.

6. The method of claim 1, wherein:
the first switching function comprises a first hypervisor function of a first hypervisor, the second switching function comprises a second hypervisor function of a second hypervisor, and the first and second hypervisors operate in different network devices;

the first switching function comprises a first NIC function of a first NIC, the second switching function comprises a second NIC function of a second NIC, and the first and second NICs operate in different network devices; or the first switching function comprises a first network switch function of a first network switch, the second switching function comprises a second network switch function of a second network switch, and the first and second network switches operate in different network devices.

7. The method of claim 1, wherein presenting the first logical switch as a unified entity comprises providing an interface service through which the first requester interacts with the first logical switch instead of the first and second switching elements.

8. The method of claim 1, further comprising:
receiving a management message directed to the logical switch; and
modifying a configuration of the first switching element, the second switching element, or both, as specified by the management message.

9. A device comprising:
a communication interface;
a first switching element in data communication with the communication interface;
a second switching element in data communication with the communication interface, the second switching element different from the first switching element;
a third switching element in data communication with the communication interface;
a fourth switching element in data communication with the communication interface, the fourth switching element different from the first, second, and third switching elements; and
control circuitry in communication with the communication interface, the control circuitry configured to:
identify a first switching function provided by the first switching element;
identify a second switching function provided by the second switching element;
identify a third switching function provided by the third switching element;
identify a fourth switching function provided by the fourth switching element;
provide, via a first logical switch, the first switching function;
provide, via the first logical switch, the second switching function;
provide, via a second logical switch, the third switching function;
provide, via the second logical switch, the fourth switching function;
present, to a first requester, the first logical switch as unified entity that includes both the first switching function of the first switching element and the second switching function of the second switching element;
preset, to a second requester, the second logical switch as a unified entity that includes both the third switching function of the third switching element and the fourth switching function of the fourth switching element; and
provide a control interface for the first and second logical switches such that the first and second logical switches are configured by a local manager as two separate physical switches.

10. The device of claim 9, wherein the first switching element operates in a first network device and the second switching element operates in a second network device different from the first network device.

11. The device of claim 9, wherein the first switching element and the second switching element operate in a common network device.

12. The device of claim 9, wherein:
the first switching function comprises a hypervisor function operating in a first network device; and
the second switching function comprises a network interface controller (NIC) function also operating in the first network device.

13. The device of claim 9, wherein:
the first switching function comprises a first hypervisor function of a first hypervisor, the second switching function comprises a second hypervisor function of a second hypervisor, and the first and second hypervisors operate in different network devices;
the first switching function comprises a first NIC function of a first NIC, the second switching function comprises a second NIC function of a second NIC, and the first and second NICs operate in different network devices; or
the first switching function comprises a first network switch function of a first network switch, the second switching function comprises a second network switch function of a second network switch, and the first and second network switches operate in different network devices.

14. The device of claim 9, wherein the control circuitry is configured to present the first logical switch as a unified entity by providing an interface service through which the first requester interacts with the first logical switch instead of the first and second switching elements.

15. The device of claim 9, where the control circuitry is further configured to:
receive an external management message directed to the first logical switch from the first requester; and
modify a configuration of the first switching element, the second switching element, or both, as specified by the external management message.

16. A product comprising:
a non-transitory computer readable medium; and
instructions stored on the non-transitory computer readable medium, that when executed by a processor, cause the processor to:
identify a first switching function provided by a first switching element in a network;
identify a second switching function provided by a second switching element in the network, the first switching element different than the second switching element;
identify a third switching function provided by a third switching element in the network;
identify, a fourth switching function provided by a fourth switching element in the network, the fourth switching element different than the first, second, and third switching elements;
provide, via a first logical switch, the first switching function;
provide, via the first logical switch, the second switching function;
provide, via a second logical switch, the third switching function;
provide, via the second logical switch, the fourth switching function;
present, to a first requester, the first logical switch as a unified entity that includes both the first switching function of the first switching element and the second switching function of the second switching element;

present, to a second requester, the second logical switch as a unified entity that includes both the third switching function of the third switching element and the fourth switching function of the fourth switching element; and control interaction between the first and second logical switches such that the first and the second logic switches interact as two separate physical switches.

17. The product of claim 16, wherein the instructions cause the processor to identify the first and second switching functions by identifying switching functions in multiple different devices.

18. The product of claim 16, wherein the instructions cause the processor to identify the first and second switching functions by identifying switching functions in a common device.

19. The product of claim 16, wherein the instructions cause the processor to present the first logical switch as a unified entity by providing an interface service through which the first requester interacts with the first logical switch instead of the first and second switching elements.

20. The product of claim 16, where the instructions further cause the processor to:

receive a management message directed to the first logical switch; and modify a configuration of the first switching element, the second switching element, or both, as specified by the management message.

* * * * *

UNITED STATES PATENT AND TRADEMARK OFFICE
CERTIFICATE OF CORRECTION

PATENT NO. : 9,031,081 B2  Page 1 of 1
APPLICATION NO. : 12/852839
DATED : May 12, 2015
INVENTOR(S) : Uri Elzur et al.

It is certified that error appears in the above-identified patent and that said Letters Patent is hereby corrected as shown below:

In the Claims

Column 19, claim 9, line 58, before "to a second requester," replace "preset," with --present,--.

Column 21, claim 16, line 6, after "first and the second" replace "logic" with --logical--.

Signed and Sealed this
Twenty-second Day of September, 2015

Michelle K. Lee
*Director of the United States Patent and Trademark Office*